(12) United States Patent
Singliar

(10) Patent No.: US 8,533,133 B1
(45) Date of Patent: Sep. 10, 2013

(54) MONITORING STATE OF HEALTH INFORMATION FOR COMPONENTS

(75) Inventor: Tomas Singliar, Sammamish, WA (US)

(73) Assignee: The Boeing Company, Chicago, IL (US)

(*) Notice: Subject to any disclaimer, the term of this patent is extended or adjusted under 35 U.S.C. 154(b) by 451 days.

(21) Appl. No.: 12/874,099

(22) Filed: Sep. 1, 2010

(51) Int. Cl.
G06F 15/18 (2006.01)

(52) U.S. Cl.
USPC .......................................... 706/12

(58) Field of Classification Search
USPC .................... 706/12, 27, 26, 15, 62
See application file for complete search history.

(56) References Cited

U.S. PATENT DOCUMENTS 7,720,779 B1    5/2010   Perry et al.

OTHER PUBLICATIONS

Dong et al, "Dynamic Bayesian Network Based Prognosis in Machining Processes", J. Shanghai Jiaotong Univ. (Sci.), 2008, 13(3): 318-322.*
Sheppard et al, "A Bayesian Approach to Diagnosis and Prognosis Using Built-In Test", IEEE Transactions on Instrumentation and Measurement, vol. 54, No. 3, Jun. 2005, teaches diagnostic and prognostic Bayesian networks.*
Sheppard et al, "Bayesian Diagnosis and Prognosis Using Instrument Uncertainty", Autotestcon, 2005. IEEE, Conference Publications, Date of Conference: Sep. 26-29, 2005, teaches diagnostic and prognostic Bayesian networks.*
Sheppard et al, "Not-So-Naïve Bayesian Networks and Unique Identification in Developing Advanced Diagnostics", 2006 IEEE Aerospace Conference, vols. 1-9. 2006.p. 3 928-3940 IEEE, New York, teaches diagnostic and prognostic Bayesian networks.*
Price, "Sentient Structures. Optimising Sensor Layouts for Direct Measurement of Discrete Variables". CSIRO Materials Science and Engineering, Report No. CMSE-2008-412, Nov. 2008, teaches diagnostic and prognostic Bayesian networks.*

* cited by examiner

Primary Examiner — Jeffrey A Gaffin
Assistant Examiner — Ilya Traktovenko
(74) Attorney, Agent, or Firm — Yee & Associates, P.C.

(57) ABSTRACT

In one advantageous embodiment, a method is provided for managing data. Information about the plurality of components is identified using data to form a plurality of instances for a plurality of nodes in response to receiving data for a plurality of components. Each node in the plurality of nodes corresponds to a component in the plurality of components. A number of variables having a range of values are formed to form a data structure. Each value in the range of values indicates a point in time at which a change to the information for a node occurs between a first instance and a second instance in the plurality of instances. More than one change between two consecutive instances is absent. The data structure is used to identify probability information about the plurality of components associated with the plurality of nodes.

30 Claims, 6 Drawing Sheets

MONITORING STATE OF HEALTH INFORMATION FOR COMPONENTS

BACKGROUND INFORMATION

1. Field

The present disclosure relates generally to processing data, and in particular, to processing state of health information. Still more particularly, the present disclosure relates to identifying probability information for present and current states of health for components.

2. Background

A processing system is a system that is configured to perform a process, such as, for example, a manufacturing process, a maintenance process, a water purification process, a vehicle control process, and/or some other suitable type of process. Different types of processing systems may be monitored to identify problems with components in the processing systems.

For example, many types of processing systems are monitored to identify when a process being performed by the processing system should be stopped to prevent an undesired event from occurring. The undesired event may be, for example, damage to components within the processing system, failure of components within the processing system, and/or other suitable types of events.

In many situations, a change in the operation of one component may not result in a failure of the entire system at the time when the operation of the component changes. However, the change in the operation of the component may begin a cascading sequence of failures through a number of other components in the system. This cascading sequence of failures may result in a failure of the entire system. In this manner, a problem with one component in a system may result in a problem with the entire system over time.

Therefore, it would be advantageous to have a method and apparatus that takes into account at least some of the issues discussed above, as well as possibly other issues.

SUMMARY

In one advantageous embodiment, a method is provided for managing data. Information about the plurality of components is identified using data to form a plurality of instances for a plurality of nodes in response to receiving data for a plurality of components. Each node in the plurality of nodes corresponds to a component in the plurality of components. A number of variables having a range of values are formed to form a data structure. Each value in the range of values indicates a point in time at which a change to the information for a node occurs between a first instance and a second instance in the plurality of instances. More than one change between two consecutive instances is absent. The data structure is used to identify probability information about the plurality of components associated with the plurality of nodes.

In another advantageous embodiment, a computer system comprises a storage device containing program code and a processor unit configured to execute the program code. The processor unit is configured to execute the program code to identify information about a plurality of components using the data to form a plurality of instances for a plurality of nodes in response to receiving data for the plurality of components. Each node in the plurality of nodes corresponds to a component in the plurality of components. The processor unit is configured to execute the program code to form a number of variables having a range of values. Each value in the range of values indicates a point in time at which a change to the information for a node occurs between a first instance and a second instance in the plurality of instances to form a data structure. More than one change between two consecutive instances is absent. The processor unit is configured to execute the program code to use the data structure to identify probability information about the plurality of components associated with the plurality of nodes.

In yet another advantageous embodiment, a computer program product for managing data comprises a computer readable storage medium and program code stored on the computer readable storage medium. Program code is present for identifying information about the plurality of components using the data to form a plurality of instances for a plurality of nodes in response to receiving data for a plurality of components. Each node in the plurality of nodes corresponds to a component in the plurality of components. Program code is present for forming a number of variables having a range of values. Each value in the range of values indicates a point in time at which a change to the information for a node occurs between a first instance and a second instance in the plurality of instances to form a data structure. More than one change between two consecutive instances is absent. Program code is present for using the data structure to identify probability information about the plurality of components associated with the plurality of nodes.

In still yet another advantageous embodiment, an apparatus for managing a manufacturing system comprises a monitoring system and a processor unit. The monitoring system is configured to monitor components in the manufacturing system. The components in the manufacturing system that are monitored are monitored components. The monitoring system is configured to generate data for the monitored components. The processor unit is in communication with the monitoring system. The processor unit is configured to receive the data for the monitored components. The processor unit is configured to identify information about the monitored components using the data, in response to receiving the data for the monitored components, to form a plurality of instances for a plurality of nodes in which each node in the plurality of nodes corresponds to a monitored component in the monitored components. The processor unit is configured to form a number of variables having a range of values, in which each value in the range of values indicates a point in time at which a change to the information for a node occurs between a first instance and a second instance in the plurality of instances to form a data structure. More than one change between two consecutive instances is absent. The processor unit is configured to identify probability information about the components in the system. The processor unit is configured to initiate an operation to be performed for the manufacturing system based on the probability information.

In one advantageous embodiment, a method is provided for managing components in a manufacturing system. The manufacturing system comprises monitoring components in the manufacturing system. The components that are monitored are monitored components. Data is generated for the monitored components. The data for the monitored components is received. In response to receiving the data, information about the monitored components is identified using the data to form a plurality of instances for a plurality of nodes for the monitored components in which each node in the plurality of nodes corresponds to a monitored component in the monitored components. A number of variables having a range of values are formed. Each value in the range of values indicates a point in time at which a change to the information for a node occurs between a first instance and a second instance in the plurality of instances to form a data structure. More than one change between two consecutive instances is absent. Probability information about the components in the manufacturing system is identified. At least one of present and future states for at least one of the monitored components and unmonitored components in the manufacturing system based on the probability information is identified. An operation is initiated to be performed on the manufacturing system in response to identifying the at least one of the monitored components and unmonitored components in the manufacturing system based on the probability information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
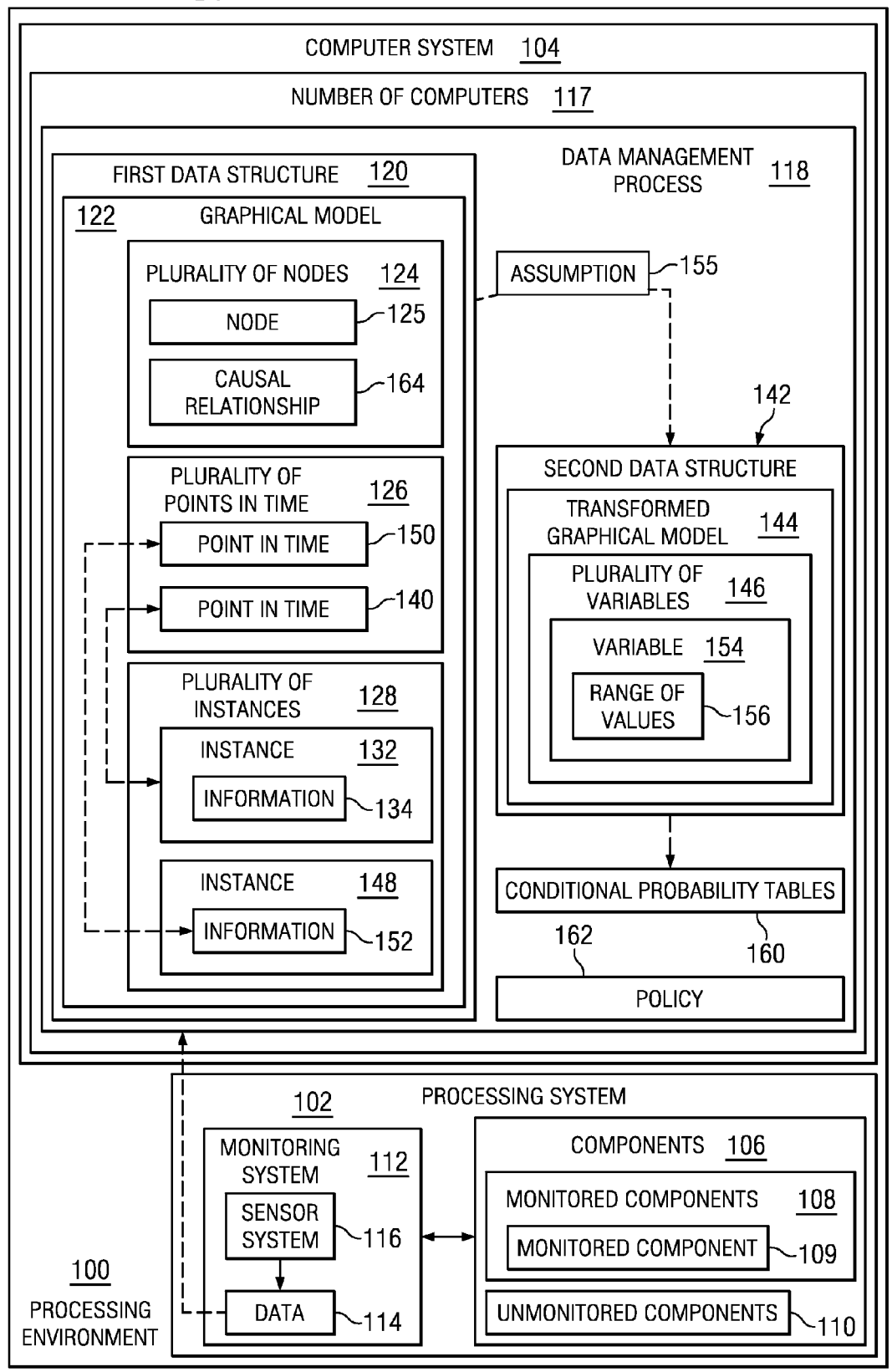
FIG. 1 is a block diagram of a processing environment in accordance with an advantageous embodiment.

The different advantageous embodiments recognize and take into account a number of different considerations. For example, the different advantageous embodiments recognize and take into account that currently available systems for monitoring and controlling processing systems may shut down a system when a component in the processing system operates in an undesired manner. For example, the system may be shut down when a component in the processing system operates outside of required parameters.

The different advantageous embodiments recognize and take into account that when a processing system is comprised of a large number of components and/or complex components, shutting down a system in response to one component not operating as desired is not always practical or even possible. Further, if the change in the operation of the component results in a cascading sequence of failures, shutting down the system too early may not be practical.

The different advantageous embodiments recognize and take into account that knowing when a particular type of failure will occur in response to a change in the operation of one component may provide valuable information. For example, a circuit breaker in an aircraft may begin to operate in an undesired manner. This problem may eventually lead to failure of a hydraulic pump. Further, the failure of the hydraulic pump may result in undesired operation of a flight control surface. The different advantageous embodiments recognize and take into account that it may be desirable to identify an expected time for when the hydraulic pump will fail in response to the undesired operation of the circuit breaker. For example, a pilot of the aircraft may use the identification of the expected time for the failure of the hydraulic pump to select an area for the aircraft to land prior to failure of the hydraulic pump.

The different advantageous embodiments recognize and take into account that different components in a processing system and the relationships between the components in the processing system may be monitored using sensor data obtained about the different components. The different advantageous embodiments recognize and take into account that monitoring the state of every component within a processing system may require more processing resources and time than desired.

Additionally, currently available processes may monitor a portion of the components in a system. The state of the components in the system that are not monitored may then be inferred. However, the different advantageous embodiments recognize and take into account that currently available algorithms for inferring the states of these monitored components may require more time than desired. Further, monitoring components within a processing system such that the state of these components is monitored in a substantially continuous manner over time may also require more processing resources and time than desired.

The different advantageous embodiments recognize and take into account that some currently available processes may use Kalman filtering to monitor the states of components. However, the different advantageous embodiments recognize and take into account that with the currently available processes, Kalman filtering may only be used when continuous state information for the components in the system. In other words, the state information needs to be a continuous, normally distributed quantity. Further, some currently available processes for monitoring systems may not take into account more than two states for a component.

The different advantageous embodiments recognize and take into account that Bayesian networks may be used to establish models for processing systems. A Bayesian network may also be referred to as a belief network or a directed acyclic graphical model. Bayesian networks that model sequences of variables over time, for example, are known as dynamic Bayesian networks. The different advantageous embodiments recognize and take into account that using a Bayesian network in which each component in a processing system is represented may require more computations, processing power, and/or time than desired.

Thus, the different advantageous embodiments provide a method and computer system for monitoring processing systems. In particular, the different advantageous embodiments provide a method and apparatus for monitoring the states of components within the processing systems.

In one advantageous embodiment, information about a plurality of components is identified using data to form a plurality of instances for a plurality of nodes in response to receiving the data for the plurality of components. Each node in the plurality of nodes corresponds to a component in the plurality of components and the plurality of nodes is associated with each other. A number of variables having a range of values are formed in which the number of variables form a data structure. Each value in the range of values indicates a point in time at which a change to the information for a node occurs between a first instance and a second instance in the plurality of instances. More than one change between two consecutive instances is absent. The data structure is used to identify probability information about a plurality of components associated with the plurality of nodes.

With reference now to the figures and more particularly with reference to FIG. 1, an illustration of a processing environment is depicted in accordance with an advantageous embodiment. In these illustrative examples, processing environment 100 may include processing system 102 and computer system 104.

Processing system 102 may be any system configured to perform a number of processes. The number of processes may include, for example, without limitation, a manufacturing process, a maintenance process, a water purification process, a vehicle control process, an aircraft control process, a surface ship control process, a spacecraft control process, and/or other suitable types of process.

As depicted, processing system 102 includes components 106. Components 106 may be, for example, without limitation, parts, software components, hardware components, devices, machines, and/or other suitable types of components. Components 106 include monitored components 108 and unmonitored components 110.

In these illustrative examples, monitored components 108 may be monitored by, for example, without limitation, monitoring system 112. Monitoring system 112 may take the form of any system configured to obtain data 114 about monitored components 108.

Data 114 may include, for example, without limitation, at least one of state of health information, maintenance data, diagnostic data, sensor data, a file, a report, a log, and other suitable types of information. For example, without limitation, data 114 may include sensor data that may be processed to identify the states of monitored components 108.

As one illustrative example, when monitored components 108 take the form of parts and/or devices, monitoring system 112 may take the form of sensor system 116. Sensor system 116 may include a number of sensors configured to generate data 114 about monitored components 108.

In these depicted examples, monitoring system 112 sends data 114 to computer system 104. Data 114 may be sent to computer system 104 using wireless and/or wired communications links. Computer system 104 comprises number of computers 117 in these examples. In these illustrative examples, computer system 104 is located remote to processing system 102. In other illustrative examples, computer system 104 may be part of processing system 102.

Data management process 118 is program code that runs on one or more of number of computers 117 in computer system 103. Data management process 118 receives data 114 and processes data 114. As depicted, data management process 118 uses data 114 to form first data structure 120. First data structure 120 may take the form of a graphical model, a table, a database, a file, a report, or some other suitable type of data structure. In these examples, first data structure 120 takes the form of graphical model 122. As one illustrative example, graphical model 122 may be a dynamic Bayesian network.

In these depicted examples, graphical model 122 includes plurality of nodes 124 and plurality of points in time 126 for plurality of nodes 124. Each node in plurality of nodes 124 corresponds to a monitored component in monitored components 108. For example, node 125 in plurality of nodes 124 corresponds to monitored component 109 in monitored components 108.

In these illustrative examples, the nodes in plurality of nodes 124 are associated with each other. The association between a first node in plurality of nodes 124 and a second node in plurality of nodes 124 takes the form of causal relationship 164. A causal relationship between the first node and the second node indicates, for example, that the state of the first node affects the state of the second node.

Plurality of points in time 126 for plurality of nodes 124 are points in time within a selected period of time. For example, plurality of points in time 126 may be within a selected period of time during which monitored components 108 were monitored.

Additionally, graphical model 122 includes plurality of instances 128. Plurality of instances 128 are formed when information about monitored components 108 at particular points in plurality of points in time 126 is identified. This information may be identified from processing data 114 for monitored components 108. For example, this information may include state information, a classification, a set of parameter values, and/or other suitable information identified from processing data 114.

As one illustrative example, data management process 118 identifies information 134 about monitored component 109 at point in time 140 in plurality of points in time 126. Information 134 is then associated with node 125 in graphical model 122 corresponding to monitored component 109 at point in time 140 to form instance 132. For example, information 134 may be placed into node 125 in graphical model 122 at point in time 140 to form instance 132. In other illustrative examples, information 134 may be associated with node 125 at point in time 140 in some other suitable manner.

Data management process 118 uses first data structure 120 to form second data structure 142. Second data structure 142 takes the form of transformed graphical model 144 in these examples. Transformed graphical model 144 is a transformed version of a dynamic Bayesian network in these examples.

As depicted, transformed graphical model 144 includes plurality of variables 146. Each variable in plurality of variables 146 corresponds to a node in plurality of nodes 124. In these illustrative examples, a variable is formed in transformed graphical model 144 when a change in the information identified for two consecutive instances occurs.

For example, instance 148 is a subsequent instance to instance 132 that is formed when data management process 118 identifies information 152 about monitored component 109 at point in time 150. Instances are not formed for any points in time between instance 132 for point in time 140 and instance 148 for point in time 150. In other words, instance 132 and instance 148 are consecutive instances.

When information 152 identified for instance 148 is different from information 134 identified for instance 132, data management process 118 forms variable 154 in plurality of variables 146 for transformed graphical model 144. Data management process 118 uses assumption 155 to form variable 154.

In these illustrative examples, assumption 155 indicates that more than one change between two consecutive instances is absent. In other words, only one change in the information identified for a node may be present between two consecutive instances. For example, if no change in the information identified for two consecutive instances is present, data management process 118 assumes that no changes in the information are present at any points in time in between the two consecutive instances. Similarly, if a change between the information identified for the two consecutive instances is present, data management process 118 assumes that this change is the only change in the information for the points in time between the two consecutive instances.

Variable 154 has range of values 156. In these illustrative examples, each value in range of values 156 indicates a possible number of points in time for which information 134 for node 125 stays the same after point in time 140 before changing to information 152 at point in time 150. In other illustrative examples, each value in range of values 156 may indicate a possible number of points in time after point in time 140 at which the change to information 134 occurs.

In these depicted examples, at least a portion of plurality of variables 146 may be associated with each other. At least a portion may be one, some, or all of plurality of variables 146. As one illustrative example, a value for a first variable in plurality of variables 146 may affect the probability that a second variable in plurality of variables 146 has a particular value. Data management process 118 uses second data structure 142 to identify this probability for the range of values for the first variable and the range of values for the second variable.

In some cases, the values of more than one variable may affect the probability of the value for another variable. Similarly, in other cases, the value of one variable may affect the probabilities of the values for more than one variable.

In these depicted examples, data management process 118 identifies these types of probabilities in the form of conditional probability tables 160. A conditional probability table identifies the probability of an event occurring given the occurrence of another event. In these examples, each of conditional probability tables 160 identifies the probability of a variable in plurality of variables 146 having a value given a number of values for a number of variables in plurality of variables 146. A number of, as used herein, means one or more. For example, a number of variables is one or more variables.

Data management process 118 may use the information provided in conditional probability tables 160 along with policy 162 to identify probabilities for the present and/or future states of monitored components 108 and/or unmonitored components 110. Policy 162 identifies associations between components in components 106. In particular, policy 162 may identify associations between the components in monitored components 108 and/or unmonitored components 110.

Further, data management process 118 may use transformed graphical model 144 to generate additional types of information. This information may be used to generate status reports for components 106, monitor the health of processing system 102, perform maintenance on processing system 104, and/or perform other suitable operations.

In particular, conditional probability tables 160 along with policy 162 may be used to initiate an operation to be performed on processing system 102. Initiating the operation to be performed on processing system 102 may include identifying the operation, sending a command to a machine configured to perform the operation, generating a report identifying the operation, performing the operation, and/or some other suitable type of process.

The operation to be performed may be, for example, without limitation, further inspection of particular components within components 106. The operation may also be, for example, without limitation, replacement of a component, repair of a component, rework of a component, and/or some other suitable type of operation.

The illustration of processing environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, a portion of number of computers 117 may be part of processing system 102, while another portion of number of computers 117 may be located remote to processing system 102. Additionally, in some illustrative examples, data management process 118 may process data 114 when data 114 is received. In other illustrative examples, a separate process running on computer system 104 may process data 114 and then send the processed data to data management process 118.

In still other illustrative embodiments, monitoring system 112 may include program code configured to monitor software components. This program code may be configured to generate data 114 and process data 114 before sending data 114 to data management process 118. Further, in some cases, both this program code and data management process 118 may be run on computer system 104.

Further, although first data structure 120 and second data structure 142 take the form of Bayesian networks in these illustrative examples, these data structures may be formed using other suitable types of probabilistic graphical models and/or probabilistic data structures.

Figure 2:
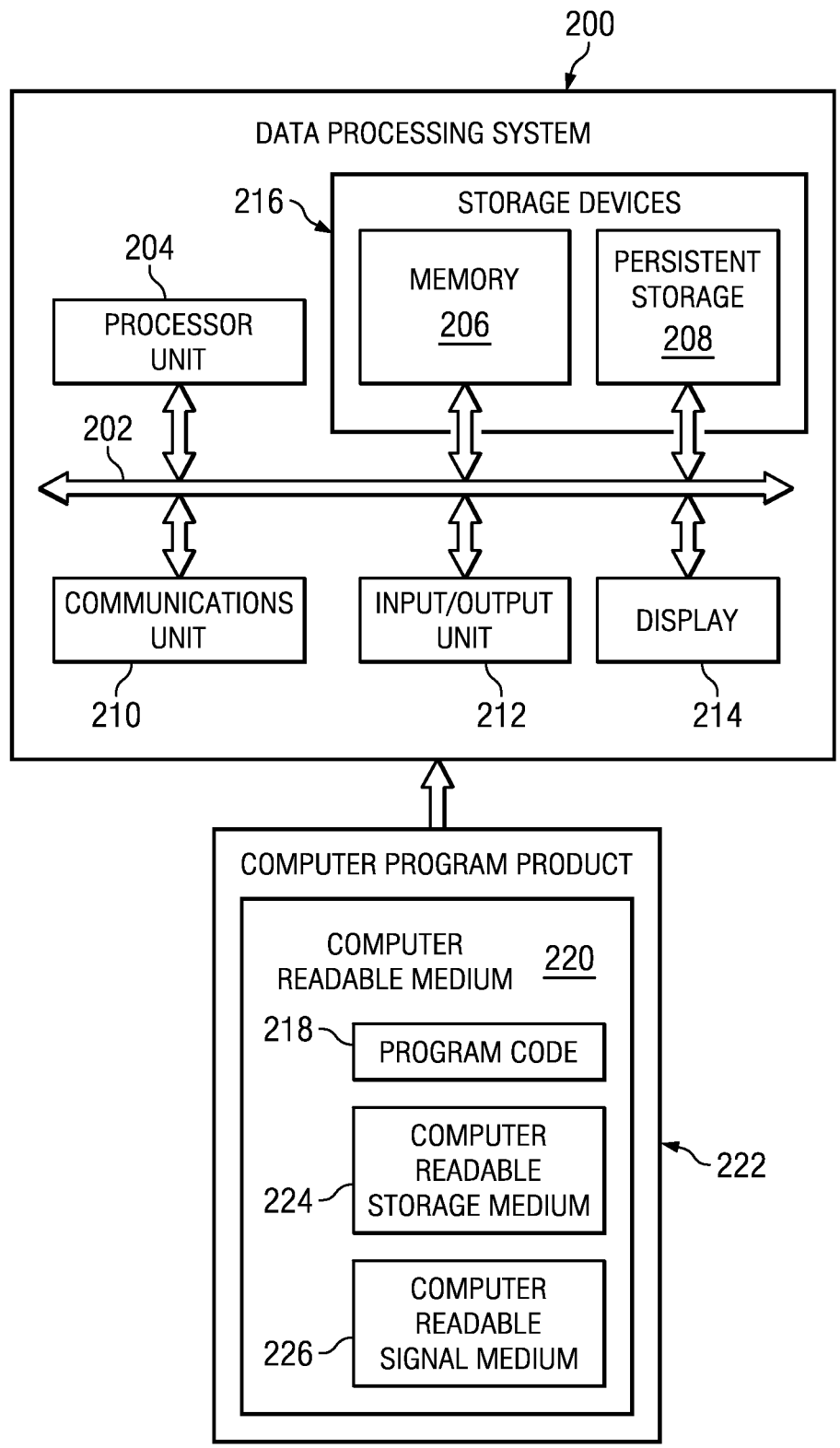
FIG. 2 is data processing system in which advantageous embodiments may be implemented.

With reference now to FIG. 2, a diagram of a data processing system is depicted in accordance with an advantageous embodiment. In this illustrative example, data processing system 200 is an example of one implementation for one or more of number of computers 117 in computer system 104 in FIG. 1. As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage medium, such as memory 206 or persistent storage 208.

Program code 218 is located in a functional form on computer readable medium 220 that is selectively removable and may be loaded onto or transferred to data processing system 200 for execution by processor unit 204. Program code 218 and computer readable medium 220 form computer program product 222. In one example, computer readable medium 220 may be computer readable storage medium 224 or computer readable signal medium 226. Computer readable storage medium 224 may include, for example, an optical or magnetic disc that is inserted or placed into a drive or other device that is part of persistent storage 208 for transfer onto a storage device, such as a hard drive, that is part of persistent storage 208. Computer readable storage medium 224 also may take the form of a persistent storage, such as a hard drive, a thumb drive, or a flash memory that is connected to data processing system 200. In some instances, computer readable storage medium 224 may not be removable from data processing system 200.

Alternatively, program code 218 may be transferred to data processing system 200 using computer readable signal medium 226. Computer readable signal medium 226 may be, for example, a propagated data signal containing program code 218. For example, computer readable signal medium 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable medium also may take the form of non-tangible medium, such as communications links or wireless transmissions containing the program code.

In some illustrative embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable medium 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
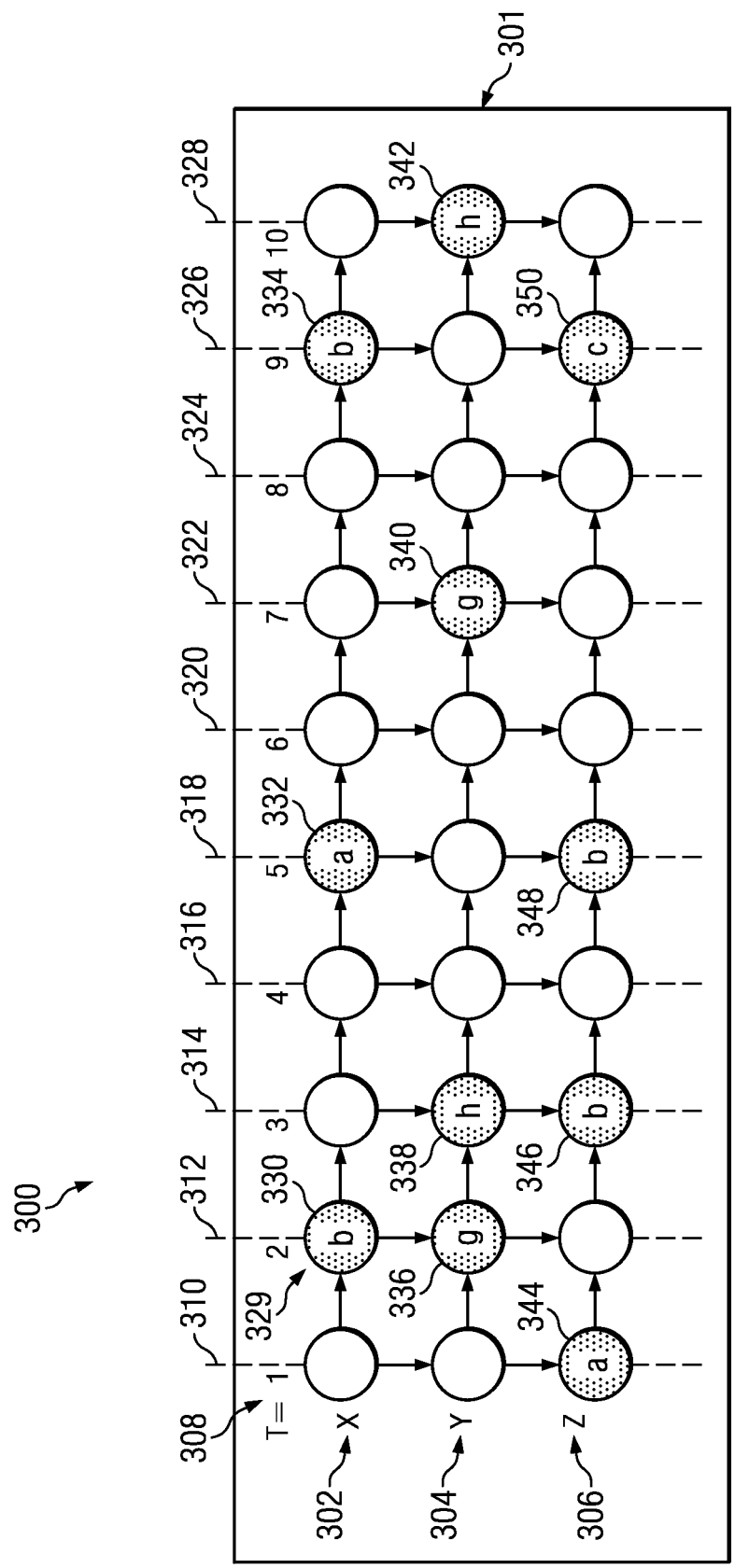
FIG. 3 is an illustration of a first data structure in accordance with an advantageous embodiment.

With reference now to FIG. 3, an illustration of a data structure is depicted in accordance with an advantageous embodiment. In this illustrative example, data structure 300 is an example of one implementation for first data structure 120 formed by data management process 118 in FIG. 1. Data structure 300 takes the form of graphical model 301 in this depicted example. Further, graphical model 301 is a dynamic Bayesian network.

As depicted, graphical model 301 includes node 302, node 304, and node 306. Node 302, node 304, and node 306 correspond to monitored components in a processing system in this illustrative example. For example, node 302, node 304, and node 306 may correspond to monitored components 108 in processing system 102 in FIG. 1. In other words, node 302, node 304, and node 306 represent these monitored components in graphical model 301.

Further, in this illustrative example, node 302 and node 304 have a causal relationship. In other words, a change in the state of node 302 may affect the state of node 304. Similarly, node 304 and node 306 have a causal relationship. A change in the state of node 304 may affect the state of node 306.

As depicted, graphical model 301 also includes plurality of points in time 308. Plurality of points in time 308 include first point in time 310, second point in time 312, third point in time 314, fourth point in time 316, fifth point in time 318, sixth point in time 320, seventh point in time 322, eighth point in time 324, ninth point in time 326, and tenth point in time 328.

Additionally, graphical model 301 includes plurality of instances 329. Plurality of instances 329 includes instances 330, 332, 334, 336, 338, 340, 342, 344, 346, 348, and 350. Each of plurality of instances 329 is formed when information about a component for a point in time in plurality of points in time 308 is identified and associated with the corresponding node. In this illustrative example, this information is state information.

For example, instance 330 is formed when state information about the component associated with node 302 for second point in time 312 is identified and associated with node 302. This association with node 302 is performed by placing the state information into node 302 at second point in time 312 in graphical model 301.

In this illustrative example, the state information identified for instance 330 indicates that the component corresponding to node 302 in graphical model 301 has an "b" state at second point in time 312. This information may be identified by processing data such as, for example, without limitation, data 114 obtained from monitoring system 112 in FIG. 1.

This data may be processed by using the data to perform calculations, evaluating the data against a number of criteria, identifying portions of the data, randomly sampling the data to form observations, and/or performing other suitable types of operations using the data.

As another illustrative example, instance 346 is formed when state information about the component associated with node 306 for third point in time 314 is identified. As depicted, the information identified for instance 346 indicates that the component corresponding to node 306 had a "b" state at third point in time 314.

As depicted, consecutive instances in plurality of instances 329 for a node may be formed for consecutive points in time. Additionally, a number of points in time for which state information is not identified for the component associated with a node may be present between consecutive instances.

Instance 330 and instance 332 are examples of consecutive instances in this depicted example. Two points in time are present between instance 330 and instance 332 for which state information about the component associated with node 302 is not identified. The state information identified to form instance 332 indicates that the component associated with node 302 has an "a" state at fifth point in time 318.

Figure 4:
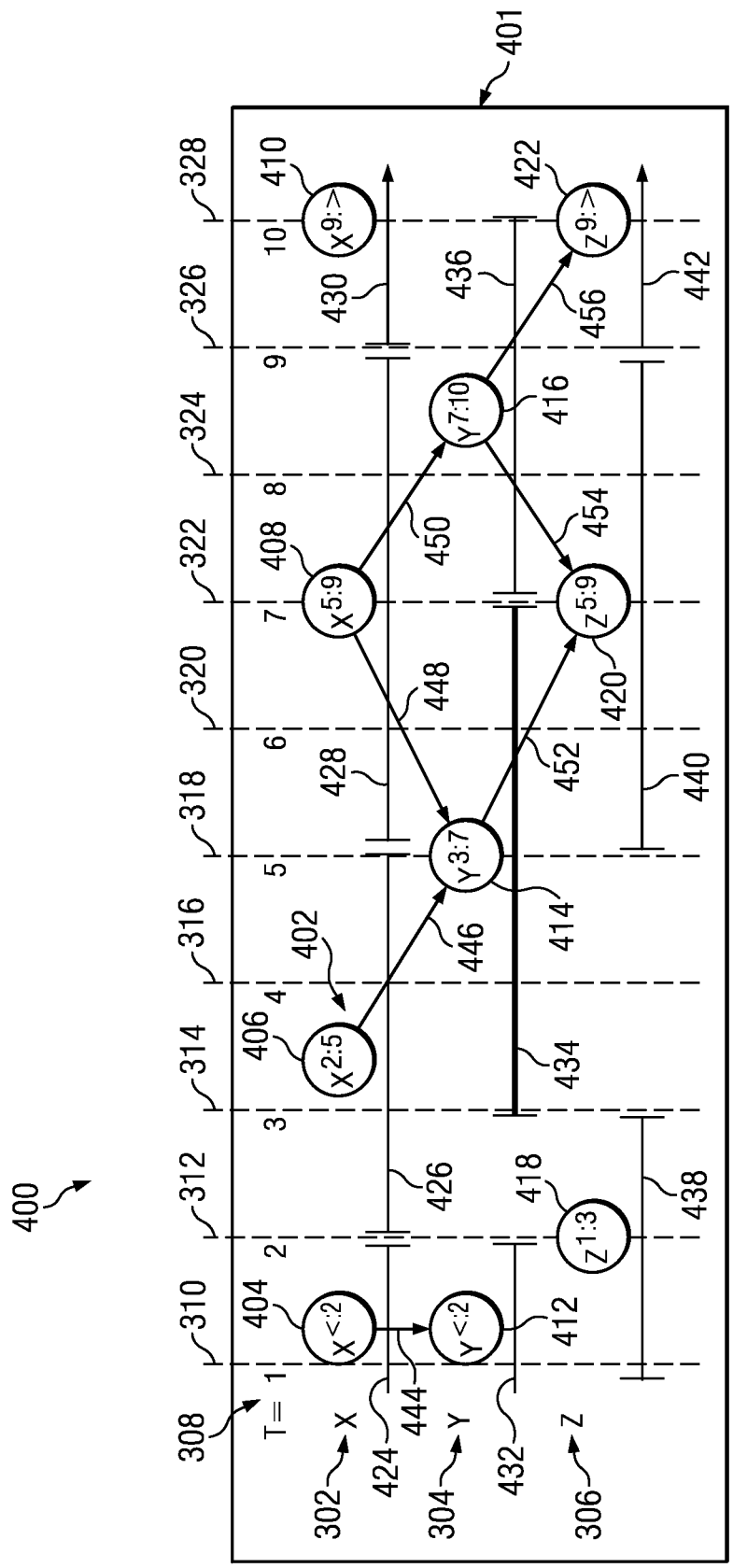
FIG. 4 is an illustration of a second data structure in accordance with an advantageous embodiment.

With reference now to FIG. 4, an illustration of a data structure is depicted in accordance with an advantageous embodiment. In this illustrative example, data structure 400 is an example of one implementation for second data structure 142 in FIG. 1. Data structure 400 takes the form of transformed graphical model 401 in this depicted example.

Transformed graphical model 401 is a transformed version of graphical model 301 in FIG. 3. Further, transformed graphical model 401 is a transformed Bayesian network. Transformed graphical model 401 is formed by a data management process such as, for example, data management process 118 in FIG. 1.

In this illustrative example, the data management process uses an assumption, such as assumption 155 in FIG. 1 to form transformed graphical model 401. The assumption, in this depicted example, indicates that more than one component state change between two consecutive instances in plurality of instances 329 in graphical model 301 in FIG. 3 is absent. Using this assumption, the data management process forms plurality of variables 402 for transformed graphical model 401. Plurality of variables 402 are an example of one implementation for plurality of variables 146 in FIG. 4.

A variable in plurality of variables 402 is formed each time that a change in the state information about a component corresponding to a node is present between two consecutive instances. In these examples, the two consecutive instances are not formed for consecutive points in time. In other words, at least one point in time is present between the two consecutive instances for which state information about the component corresponding to the node is not identified.

As depicted, plurality of variables 402 in transformed graphical model 401 includes variables 404, 406, 408, 410, 412, 414, 416, 418, 420, and 422. Each variable in plurality of variables 402 corresponds to one of node 302, node 304, and node 306 in FIG. 3. For example, variables 404, 406, 408, and 410 correspond to node 302 in FIG. 3. Variables 412, 414, and 416 correspond to node 304 in FIG. 3. Variables 418, 420, and 422 correspond to node 306 in FIG. 3.

Further, each of plurality of variables 402 is associated with an interval of time within the range of plurality of points in time 308. For example, variables 404, 406, 408, 410, 412, 414, 416, 418, 420, and 422 are associated with intervals of time 424, 426, 428, 430, 432, 434, 436, 438, 440, and 442, respectively.

Each interval of time extends from the point in time for a first instance to the point in time for a second instance in which a change in the state information is present between the first instance and the second instance. For example, interval 426 associated with variable 406 extends from second point in time 312 to fifth point in time 318 between which the state information about the component associated with node 302 changes.

In this illustrative example, a portion of the intervals of time in transformed graphical model 401 may not begin or end at a point in time in plurality of points in time 308. In other words, an interval of time associated with a variable in plurality of variables 402 may have an unknown beginning point in time or an unknown ending point in time. If reasoning about a state for which there is no preceding (first) or for which there is no following (second) data instance is required, each possible value is consecutively hypothesized and a distribution of possible values obtained in this manner.

In this depicted example, a beginning point in time for an interval of time is unknown when an instance for a node is formed at least one point in time after the first point in time in plurality of points in time 308. For example, interval 424 associated with variable 404 has an unknown beginning point in time. An ending point in time for an interval of time is present when an instance for a node is not formed for the last point in time in plurality of points in time 308. For example, interval 430 associated with variable 410 has an unknown ending point in time.

Each of the variables in plurality of variables 402 has a range of values identified based on the assumption used by the data management process. Each value in this range of values indicates a number of possible points in time for which the state information about the component corresponding to the node stays the same before changing.

As one illustrative example, the state information about the component corresponding to node 302 changes between second point in time 312 and fifth point in time 318 as depicted in FIG. 3. The component changes from having a "b" state at second point in time 312 to an "a" state at fifth point in time 318, as depicted in FIG. 3. Variable 406 associated with this change has a range of values that includes 0, 1, and 2. For example, the state information about the component corresponding to node 302 may change at substantially third point in time 314 such that variable 406 has a value of 0. The state information may change at substantially fourth point in time 316 such that variable 406 has a value of 1. The state information may change at substantially fifth point in time 318 such that variable 406 has a value of 2.

Additionally, variable 404 and variable 412 have unknown ranges of values. The range of values for each of these variables is unknown because instances prior to first point in time 310 have not been formed in this example. Further, variable 410 and variable 422 also have unknown ranges of values. The range of values for each of these variables is unknown because instances after tenth points in time 328 have not been formed in this example.

As depicted, transformed graphical model 401 also includes associations 444, 446, 448, 450, 452, 454, and 456. These associations indicate the variables in plurality of variables 402 for which the values of the variables may affect the probability of a particular value for another variable. For example, the value for variable 406 and the value for variable 408 may affect the probability that variable 414 will have a particular value. Further, the value for variable 408 may affect the probability of the value for 416.

In this illustrative example, the data management process may use transformed graphical model 401 to generate conditional probability tables to identify the probabilities for the different states of the components corresponding to node 302, node 304, and node 306.

Figure 5:
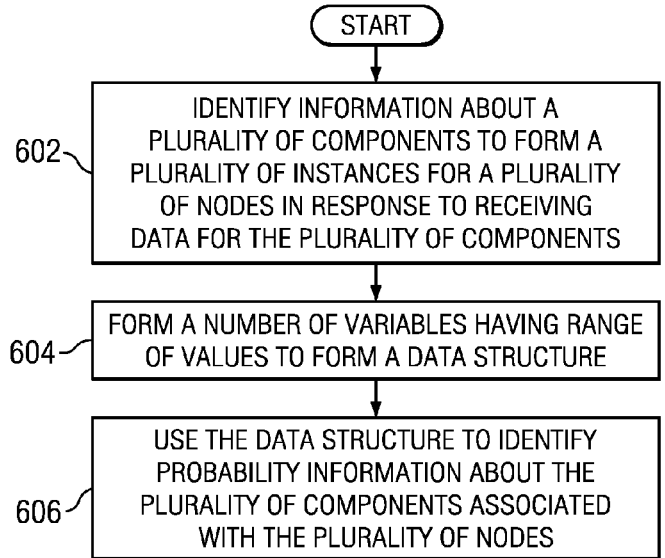
FIG. 5 is an illustration of a conditional probability table in accordance with an advantageous embodiment.

With reference now to FIG. 5, an illustration of a conditional probability table is depicted in accordance with an advantageous embodiment. In this illustrative example, conditional probability table 500 is an example of one implementation of a conditional probability table in conditional probability tables 160 in FIG. 1.

Conditional probability table 500 is an example of a conditional probability table that may be generated using transformed graphical model 401 in FIG. 4. In this illustrative example, conditional probability table 500 is generated based on the association of variable 406 and variable 408 with variable 414. Conditional probability table 500 identifies probabilities 502. Each probability in probabilities 502 is a probability of variable 414 in FIG. 4 having a particular value given a value for variable 406 in FIG. 4 and a value for variable 408 in FIG. 4.

As depicted, conditional probability table 500 has rows 504 and columns 506. Rows 504 include all possible combinations of values for variable 406 and variable 408. Columns 506 include all possible values for variable 414.

In these illustrative examples, probabilities 502 may be generated using the following equations:

$$\tilde{P}(\tilde{X}^{t_0:t_1} = v \mid Y^{s_0^1:s_1^1} = u^1, \ldots, Y^{s_0^L:s_1^L} = u^L) = \left[\prod_{t=t_0}^{t_0+v} \pi^{(t)}\right] \overline{\pi}^{(t_0+v+1)}, \quad (1)$$

where $$\pi^{(t)} = \begin{cases} P(X = x^{t_1} \mid Y = w, X^{prev} = X^{t_0}) \\ \quad \text{if } Y^t \text{ is observed to be } w, \\ P(X = x^{t_1} \mid Y = pa^t, (\tilde{X}^{t_0:t_1}), X^{prev} = x^{t_0}) \\ \quad \text{if } Y^t \text{ is unobserved} \end{cases} \quad (2)$$

and analogously $$\overline{\pi}^{(t)} = \begin{cases} P(X = x^{t_0} \mid Y = w, X^{prev} = X^{t_0}) \\ \quad \text{if } Y^t \text{ is observed to be } w, \\ P(X = x^{t_0} \mid Y = pa^t, (\tilde{X}^{t_0:t_1}), X^{prev} = x^{t_0}) \\ \quad \text{if } Y^t \text{ is unobserved} \end{cases} \quad (3)$$

where equation (1) uses standard probabilistic notation.

As one illustrative example, probability 506 in probabilities 502 may be calculated using the above equations, where t0 is 3, t1 is 7 and v is 2. A parent variable is a variable in which the value for the variable has an effect on the probability of another variable having a particular value. For variable 506, the parent variables are identified as X(2:5) and X(5:9). Using the above equations, the multiplication $\overline{P}^{(3)}\overline{P}^{(4)}\overline{P}^{(5)}P^{(6)}$ is calculated, with the "P" probabilities defined by equations (2) and (3).

While a variable may have multiple parent variables, the probability of a change in the information for the node associated with the variable at time t is determined by the conditional probability table of at most one parent variable in which $s_{j0} < t \le s_{j1}$. This distinguished parent is denoted by $Pa^t(X^{t_0:t_1})$ and its value at time t by $pa^t(X^{t_0:t_1})$ in equation (3).

In addition, for nodes that do not have parents in the second data structure, the specification of the conditional probability table is simplified to $$\pi^{(t)} = P(X = x^{t_1} \mid X = x^{t_0})$$

$$\overline{\pi}^{(t)} = P(x = x^{t_0} \mid X = x^{t_0})$$

Figure 6:
FIG. 6 is an illustration of a flowchart for managing data in accordance with an advantageous embodiment.

With reference now to FIG. 6, a flowchart of the process of managing data is depicted in accordance with an advantageous embodiment. Process 600 illustrated in FIG. 6 may be implemented using data management process 118 running on computer system 104 in processing environment 100 in FIG. 1.

Process 600 begins by identifying information about a plurality of components to form a plurality of instances for a plurality of nodes in response to receiving data for the plurality of components (operation 602). Each node in the plurality of nodes corresponds to a component in the plurality of components.

Next, process 600 forms a number of variables having range of values to form a data structure (operation 604). Each value in the range of values indicates a point in time at which a change to the information for a node occurs between a first instance and a second instance in the plurality of instances.

Thereafter, process 600 uses the data structure to identify probability information about the plurality of components associated with the plurality of nodes (operation 606), with the process terminating thereafter.

Figure 7:
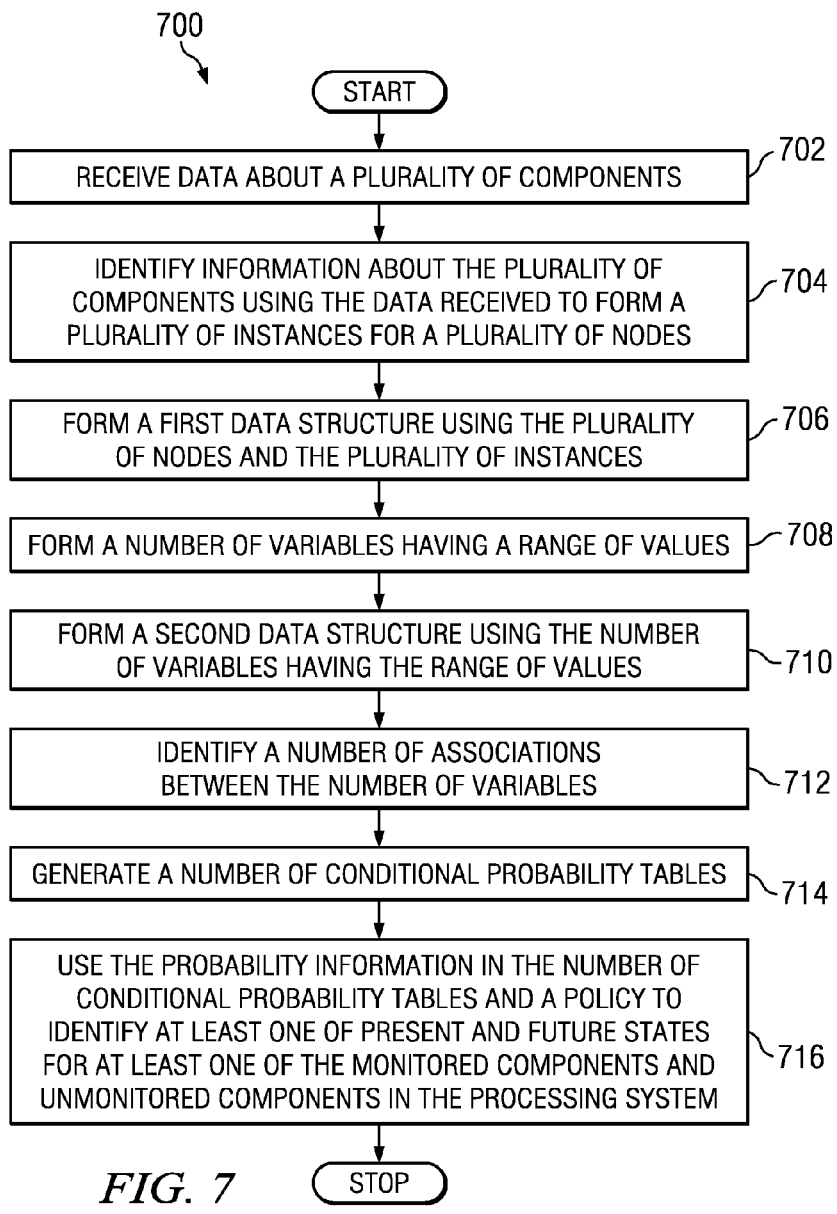
FIG. 7 is an illustration of a flowchart for managing data in accordance with an advantageous embodiment.

With reference now to FIG. 7, an illustration of a flowchart of a process for managing data is depicted in accordance with an advantageous embodiment. Process 700 illustrated in FIG. 7 may be implemented using data management process 118 running on computer system 104 in processing environment 100 in FIG. 1.

Process 700 begins by receiving data about a plurality of components (operation 702). The data received in operation 702 may be received from a monitoring system, such as monitoring system 112 in FIG. 1. The monitoring system monitors the plurality of components such that the plurality of components are monitored components. These monitored components are part of a processing system. The processing system also includes unmonitored components.

Process 700 then identifies information about the plurality of components using the data received to form a plurality of instances for a plurality of nodes (operation 704). Each node in the plurality of nodes corresponds to a component in the plurality of components.

Thereafter, process 700 forms a first data structure using the plurality of nodes and the plurality of instances (operation 706). The first data structure may be first data structure 120 in FIG. 1. Further, the first data structure may take the form of first data structure 300 in FIG. 3.

Process 700 then forms a number of variables having a range of values (operation 708). Each value in the range of values indicates a point in time at which a change to the information for a node occurs between a first instance and a second instance in the plurality of instances.

Next, process 700 forms a second data structure using the number of variables having the range of values (operation 710). The second data structure may be, for example, second data structure 142 in FIG. 1. Further, the second data structure may take the form of second data structure 400 in FIG. 4.

Thereafter, process 700 identifies a number of associations between the number of variables (operation 712). Then, process 700 generates a number of conditional probability tables (operation 714). In this illustrative example, each conditional probability table identifies probabilities for when the information for the node changes between the first instance and the second instance based on when the information for a number of nodes in the plurality of nodes changes.

Thereafter, the process uses the probability information in the number of conditional probability tables and a policy to identify at least one of present and future states for at least one of the monitored components and unmonitored components in the processing system (operation 716), with the process terminating thereafter.

Figure 8:
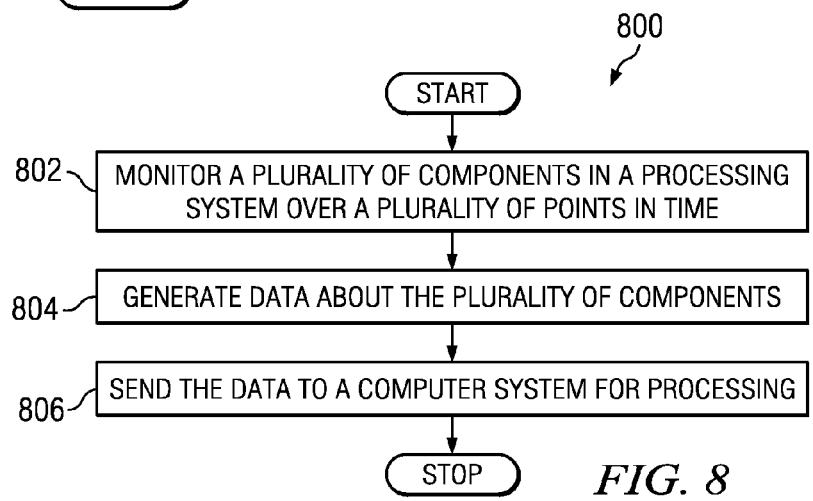
FIG. 8 is an illustration of a flowchart for monitoring components in accordance with an advantageous embodiment.

With reference now to FIG. 8, an illustration of a flowchart of a process for monitoring components in a system is depicted in accordance with an advantageous embodiment. Process 800 illustrated in FIG. 8 may be implemented using monitoring system 112 in processing environment 100 in FIG. 1.

Process 800 begins by monitoring a plurality of components in a processing system over a plurality of points in time (operation 802). Process 800 generates data about the plurality of components (operation 804). This data may include, for example, without limitation, state of health information, maintenance data, diagnostic data, sensor data, a file, a report, a log, and/or other suitable types of information.

Thereafter, process 800 sends the data to a computer system for processing (operation 806), with the process terminating thereafter. The computer system may be, for example, computer system 104 in FIG. 1. Further, the data may be received by a data management process running on the computer system. This data may then be processed using process 600 illustrated in FIG. 6 and/or process 700 illustrated in FIG. 7.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing data, the method comprising:
responsive to receiving data for a plurality of components, identifying information about the plurality of components using the data to form a plurality of instances for a plurality of nodes in which each node in the plurality of nodes corresponds to a component in the plurality of components;
forming a number of variables having a range of values, in which each value in the range of values indicates a point in time at which a change to the information for a particular node occurs between a first instance and a second instance in the plurality of instances to form a data structure, wherein more than one change between two consecutive instances is absent; and
using the data structure to identify probability information about the plurality of components associated with the plurality of nodes
wherein the probability information comprises probabilities of when a state of a component X in the plurality of components changes based on when a number of states for a number of components in the plurality of components changes, calculated such that:
each entry in a conditional probability table of a modified network corresponds to a probability that a value of component X changes precisely at a particular time given that a state of components on which the state of the component X depends, the parents, changes at a particular combination of times, and is defined as follows:
a probability that a change in the state of the component X which is observed to certainly occur between time $t_0$ and time $t_1$ occurs precisely at time step v, conditioned on the state of the parents changing their state precisely at time steps $U_1, U_2, \ldots, U_L$ is given by a product of a number of negative elementary transition probabilities, one for each time up to and including v, and a positive elementary transition probability from time $t_0$ to time $t_1$ at time step (v+1);
such that a negative elementary transition probability for time t corresponds to the probability, of a presumed state of the parents failing to induce a state change in component X, and is retrieved from a corresponding conditional probability table of an original Bayesian network data structure, where the corresponding conditional probability table is determined by the state of the parents that the parents would have at time t had the changes in their state occurred precisely at time steps $U_1, U_2, \ldots, U_L$ and the state of component X being a value at a beginning of an interval in which the state change in component X is known to have occurred; and
such that a positive elementary transition probability for time t corresponds to the probability of the presumed state of the parents, inducing the change in the state of component X, and is retrieved from the corresponding conditional probability table of the original Bayesian network data structure, where the corresponding conditional probability table is determined by the state of the parents that the parents would have at time t had the changes in their state occurred precisely at time steps $U_1, U_2, \ldots, U_L$ and the state of component X being the value at an end of an interval in which the change is known to have occurred.

2. The method of claim 1 further comprising:
monitoring the plurality of components in a system using a monitoring system, wherein the monitoring system is configured to generate the data for a plurality of points in time, and wherein the plurality of components are monitored components and components in the system that are not monitored are unmonitored components.

3. The method of claim 2, wherein the change to the information for the particular node is a change to at least one of: state information, health information, maintenance data, diagnostic data, sensor data, a file, a report, and a log for a component to which the node corresponds.

4. The method of claim 2, wherein the probability information includes probabilities of when states of the unmonitored components change based on when changes to states of the monitored components occur and further comprising:
using the probability information and a policy to identify at least one of present and future states for at least one of the monitored components and unmonitored components in the system.

5. The method of claim 4 further comprising:
initiating an operation to perform on the system based on an identification of the at least one of the present and future states for the at least one of the monitored components and unmonitored components in the system.

6. The method of claim 2, wherein the system is configured to perform a process selected from one of a manufacturing process, a maintenance process, a water purification process, a vehicle control process, an aircraft control process, a surface ship control process, and a spacecraft control process.

7. The method of claim 1 further comprising:
forming a first data structure using the plurality of nodes and the plurality of instances; and
forming the data structure using the number of variables having the range of values, wherein the data structure is a second data structure.

8. The method of claim 7, wherein the step of using the second data structure to identify the probability information about the plurality of components associated with the plurality of nodes comprises:
generating a number of conditional probability tables in which each of the number of conditional probability tables identifies probabilities for when the information for the particular node changes between the first instance and the second instance based on when information for a number of nodes in the plurality of nodes changes.

9. The method of claim 7, wherein the first data structure is a graphical model and wherein the step of forming the first data structure using the plurality of nodes and the plurality of instances comprises:
identifying a number of causal relationships between pairs of nodes in the plurality of nodes; and
forming the graphical model using the plurality of nodes, the plurality of instances, and the number of causal relationships.

10. The method of claim 9, wherein the graphical model is a dynamic Bayesian network.

11. The method of claim 7, wherein the second data structure is a transformed graphical model and wherein the step of forming the second data structure using the number of variables having the range of values comprises:
identifying a number of associations between the number of variables in which an association in the number of associations indicates that a first value of a first variable in the number of variables affects a probability of a second value of a second variable in the number of variables.

12. The method of claim 11, wherein the transformed graphical model is a transformed dynamic Bayesian network.

13. The method of claim 1, wherein the data comprises at least one of state of health information, maintenance data, diagnostic data, sensor data, a file, a report, and a log.

14. A computer system comprising:
a storage device containing program code;
a processor unit configured to execute the program code to identify information about a plurality of components using data to form a plurality of instances for a plurality of nodes in response to receiving data for the plurality of components in which each node in the plurality of nodes corresponds to a component in the plurality of components; form a number of variables having a range of values, in which each value in the range of values indicates a point in time at which a change to the information for a particular node occurs between a first instance and a second instance in the plurality of instances to form a data structure, wherein more than one change between two consecutive instances is absent; and use the data structure to identify probability information about the plurality of components associated with the plurality of nodes, wherein the probability information is calculated such that:
each entry in a conditional probability table of a modified network corresponds to a probability that a value of component X changes precisely at a particular time given that a state of components on which the state of the component X depends, the parents, changes at a particular combination of times, and is defined as follows:
a probability that a change in the state of the component X which is observed to certainly occur between time $t_0$ and time $t_1$ occurs precisely at time step v, conditioned on the state of the parents changing their state precisely at time steps $U_1, U_2, \ldots, U_L$ is given by a product of a number of negative elementary transition probabilities, one for each time up to and including v, and a positive elementary transition probability from time $t_0$ to time $t_1$ at time step (v+1);
such that a negative elementary transition probability for time t corresponds to the probability, of a presumed state of the parents failing to induce a state change in component X, and is retrieved from a corresponding conditional probability table of an original Bayesian network data structure, where the corresponding conditional probability table is determined by the state of the parents that the parents would have at time t had the changes in their state occurred precisely at time steps $U_1, U_2, \ldots, U_L$ and the state of component X being a value at a beginning of an interval in which the state change in component X is known to have occurred; and
such that a positive elementary transition probability for time t corresponds to the probability of the presumed state of the parents, inducing the change in the state of component X, and is retrieved from the corresponding conditional probability table of the original Bayesian network data structure, where the corresponding conditional probability table is determined by the state of the parents that the parents would have at time t had the changes in their state occurred precisely at time steps $U_1, U_2, \ldots, U_L$ and the state of component X being the value at an end of an interval in which the change is known to have occurred.

15. The computer system of claim 14, wherein the change to the information for the particular node is a change to at least one of: state information, health information, maintenance data, diagnostic data, sensor data, a file, a report, and a log for a component to which the node corresponds.

16. The computer system of claim 14, wherein the processor unit is further configured to execute the program to code to form a first data structure using the plurality of nodes and the plurality of instances; and form the data structure using the number of variables having the range of values, wherein the data structure is a second data structure.

17. The computer system of claim 16, wherein in being configured to execute the program code to use the second data structure to identify the probability information about the plurality of components associated with the plurality of nodes, the processor unit is configured to execute the program code to generate a number of conditional probability tables in which each of the number of conditional probability tables identifies probabilities for when the information for the particular node changes between the first instance and the second instance based on when information for a number of nodes in the plurality of nodes changes.

18. The computer system of claim 17, wherein the second data structure is a transformed graphical model and wherein in being configured to execute the program code to form the second data structure using the number of variables having the range of values, the processor unit is configured to execute the program code to identify a number of associations between the number of variables in which an association in the number of associations indicates that a first value of a first variable in the number of variables affects a probability of a second value of a second variable in the number of variables.

19. The computer system of claim 18, wherein the transformed graphical model is a transformed dynamic Bayesian network.

20. The computer system of claim 16, wherein the first data structure is a graphical model and wherein in being configured to execute the program code to form the first data structure using the plurality of nodes and the plurality of instances, the processor unit is configured to identify a number of causal relationships between pairs of nodes in the plurality of nodes; and form the graphical model using the plurality of nodes, the plurality of instances, and the number of causal relationships.

21. The computer system of claim 20, wherein the graphical model is a dynamic Bayesian network.

22. The computer system of claim 14, wherein the probability information identified using the data structure comprises probabilities of when a state for the component in the plurality of components changes based on when a number of states for a number of components in the plurality of components changes.

23. A computer program product for managing data comprising:
a non-transitory computer readable storage medium;
program code, stored on non-transitory computer readable storage medium, for identifying information about a plurality of components using the data to form a plurality of instances for a plurality of nodes in response to receiving data for the plurality of components, wherein each node in the plurality of nodes corresponds to a component in the plurality of components;
program code, stored on the non-transitory computer readable storage medium, for forming a number of variables having a range of values, in which each value in the range of values indicates a point in time at which a change to the information for a particular node occurs between a first instance and a second instance in the plurality of instances to form a data structure, wherein more than one change between two consecutive instances is absent; and
program code, stored on the non-transitory computer readable storage medium, for using the data structure to identify probability information about the plurality of components associated with the plurality of nodes,
wherein the probability information is calculated such that:
each entry in a conditional probability table of a modified network corresponds to a probability that a value of component X changes precisely at a particular time given that a state of components on which the state of the component X depends, the parents, changes at a particular combination of times, and is defined as follows:
a probability that a change in the state of the component X which is observed to certainly occur between time $t_0$ and time $t_1$ occurs precisely at time step v, conditioned on the state of the parents changing their state precisely at time steps $U_1, U_2, \ldots, U_L$ is given by a product of a number of negative elementary transition probabilities, one for each time up to and including v, and a positive elementary transition probability from time $t_0$ to time $t_1$ at time step (v+1);
such that a negative elementary transition probability for time t corresponds to the probability, of a presumed state of the parents failing to induce a state change in component X, and is retrieved from a corresponding conditional probability table of an original Bayesian network data structure, where the corresponding conditional probability table is determined by the state of the parents that the parents would have at time t had the changes in their state occurred precisely at time steps $U_1, U_2, \ldots, U_L$ and the state of component X being a value at a beginning of an interval in which the state change in component X is known to have occurred; and
such that a positive elementary transition probability for time t corresponds to the probability of the presumed state of the parents, inducing the change in the state of component X, and is retrieved from the corresponding conditional probability table of the original Bayesian network data structure, where the corresponding conditional probability table is determined by the state of the parents that the parents would have at time t had the changes in their state occurred precisely at time steps $U_1, U_2, \ldots, U_L$ and the state of component X being the value at an end of an interval in which the change is known to have occurred.

24. An apparatus for managing a manufacturing system comprising:
a monitoring system configured to monitor components in the manufacturing system, wherein the components include monitored components and unmonitored components and to generate data for the monitored components; and
a processor unit in communication with the monitoring system and configured to receive the data for the monitored components; identify information about the monitored components using the data, in response to receiving the data for the monitored components, to form a plurality of instances for a plurality of nodes in which each node in the plurality of nodes corresponds to a monitored component in the monitored components; form a number of variables having a range of values, in which each value in the range of values indicates a point in time at which a change to the information for a particular node occurs between a first instance and a second instance in the plurality of instances to form a data structure, wherein more than one change between two consecutive instances is absent; identify probability information about the components in the system; and initiate an operation to be performed for the manufacturing system based on the probability information,
wherein the probability information comprises probabilities of when a state of a component X in the plurality of components changes based on when a number of states for a number of components in the plurality of components changes, calculated such that:
each entry in a conditional probability table of a modified network corresponds to a probability that a value of component X changes precisely at a particular time given that a state of components on which the state of the component X depends, the parents, changes at a particular combination of times, and is defined as follows:
a probability that a change in the state of the component X which is observed to certainly occur between time $t_0$ and time $t_1$ occurs precisely at time step v, conditioned on the state of the parents changing their state precisely at time steps $U_1, U_2, \ldots, U_L$ is given by a product of a number of negative elementary transition probabilities, one for each time up to and including v, and a positive elementary transition probability from time $t_0$ to time $t_1$ at time step (v+1);

such that a negative elementary transition probability for time t corresponds to the probability, of a presumed state of the parents failing to induce a state change in component X, and is retrieved from a corresponding conditional probability table of an original Bayesian network data structure, where the corresponding conditional probability table is determined by the state of the parents that the parents would have at time t had the changes in their state occurred precisely at time steps $U_1, U_2, \ldots, U_L$ and the state of component X being a value at a beginning of an interval in which the state change in component X is known to have occurred; and such that a positive elementary transition probability for time t corresponds to the probability of the presumed state of the parents, inducing the change in the state of component X, and is retrieved from the corresponding conditional probability table of the original Bayesian network data structure, where the corresponding conditional probability table is determined by the state of the parents that the parents would have at time t had the changes in their state occurred precisely at time steps $U_1, U_2, \ldots, U_L$ and the state of component X being the value at an end of an interval in which the change is known to have occurred.

25. The apparatus of claim 24, wherein the change to the information for the node is a change to at least one of: state information, health information, maintenance data, diagnostic data, sensor data, a file, a report, and a log for a component to which the node corresponds.

26. The apparatus of claim 24, wherein the processor unit is further configured to execute a program code to form a first data structure using the plurality of nodes and the plurality of instances; and form the data structure using the number of variables having the range of values, wherein the data structure is a second data structure.

27. The apparatus of claim 24, wherein the processor unit is further configured to form a first data structure using the plurality of nodes and the plurality of instances; and form the data structure using the number of variables having the range of values, wherein the data structure is a second data structure.

28. The apparatus of claim 27, wherein the first data structure is a graphical model and the second data structure is a transformed graphical model.

29. A method for managing components in a manufacturing system, the method comprising:

monitoring components in the manufacturing system, wherein the components that are monitored are monitored components;

generating data for the monitored components;

receiving the data for the monitored components;

identifying information about the monitored components using the data, in response to receiving the data, to form a plurality of instances for a plurality of nodes for the monitored components in which each node in the plurality of nodes corresponds to a monitored component in the monitored components;

forming a number of variables having a range of values, in which each value in the range of values indicates a point in time at which a change to the information for a node occurs between a first instance and a second instance in the plurality of instances to form a data structure, wherein more than one change between two consecutive instances is absent;

identifying probability information about the components in the manufacturing system;

identifying at least one of present and future states for at least one of the monitored components and unmonitored components in the manufacturing system based on the probability information; and initiating an operation to be performed on the manufacturing system in response to identifying the at least one of the monitored components and unmonitored components in the manufacturing system based on the probability information, wherein the probability information comprises probabilities of when a state of a component X in the plurality of components changes based on when a number of states for a number of components in the plurality of components changes, calculated such that:

each entry in a conditional probability table of a modified network corresponds to a probability that a value of component X changes precisely at a particular time given that a state of components on which the state of the component X depends, the parents, changes at a particular combination of times, and is defined as follows:

a probability that a change in the state of the component X which is observed to certainly occur between time $t_0$ and time $t_1$ occurs precisely at time step v, conditioned on the state of the parents changing their state precisely at time steps $U_1, U_2, \ldots, U_L$ is given by a product of a number of negative elementary transition probabilities, one for each time up to and including v, and a positive elementary transition probability from time $t_0$ to time $t_1$ at time step (v+1);

such that a negative elementary transition probability for time t corresponds to the probability, of a presumed state of the parents failing to induce a state change in component X, and is retrieved from a corresponding conditional probability table of an original Bayesian network data structure, where the corresponding conditional probability table is determined by the state of the parents that the parents would have at time t had the changes in their state occurred precisely at time steps $U_1, U_2, \ldots, U_L$ and the state of component X being a value at a beginning of an interval in which the state change in component X is known to have occurred; and such that a positive elementary transition probability for time t corresponds to the probability of the presumed state of the parents, inducing the change in the state of component X, and is retrieved from the corresponding conditional probability table of the original Bayesian network data structure, where the corresponding conditional probability table is determined by the state of the parents that the parents would have at time t had the changes in their state occurred precisely at time steps $U_1, U_2, \ldots, U_L$ and the state of component X being the value at an end of an interval in which the change is known to have occurred.

30. The method of claim 29, wherein the change to the information for the node is a change to at least one of state information, health information, maintenance data, diagnostic data, sensor data, a file, a report, and a log for a component to which the node corresponds.

* * * * *